June 22, 1965  F. FISCHER ETAL  3,190,550
PROGRAM CONTROL DEVICE IN ACCOUNTING MACHINES
Filed June 28, 1961  3 Sheets-Sheet 1

INVENTORS
Felix Fischer
Viktor Korosi

Ooms, McDougall + Hersh
atty.

June 22, 1965 F. FISCHER ETAL 3,190,550
PROGRAM CONTROL DEVICE IN ACCOUNTING MACHINES
Filed June 28, 1961 3 Sheets-Sheet 3

INVENTOR
Felix Fischer
Viktor Korosi

Ooms, McDougall + Hersh
atty.

United States Patent Office 3,190,550
Patented June 22, 1965

3,190,550
PROGRAM CONTROL DEVICE IN
ACCOUNTING MACHINES
Felix Fischer and Viktor Körösi, Oberndorf (Neckar),
Germany, assignors to Olympia Werke A.G., Wilhelmshaven, Germany, a German body corporate
Filed June 28, 1961, Ser. No. 120,409
4 Claims. (Cl. 235—60.47)

The invention relates to a device for controlling the course of programs in accounting machines and particularly in those accounting machines which consist of typewriters or calculating machines which are electrically connected together.

It is known to combine typewriters electrically with calculating machines. For example, the numerical keys of a typewriter may be operationally connected to electromagnetic drive means and the keys of a calculating machine to contacts, in such a manner that the figures which are fed into the calculating machine through the calculating-machine keyboard can be included, by remote transmission, in the alphabetical text of the typewriter.

It is also known to operate a calculating machine remotely through a typewriter, that is to say, to feed the figures supplied for a calculation into the calculating machine through the numerical keys of the typewriter and to initiate operations in the calculating machine from the keyboard of the typewriter. Further, designs are known as a result of which it is possible to exchange functional instructions between the combined typewriter and calculating machine. This exchange of functional instructions acquires particular importance when the simple adding machine in such a combination is replaced by a machine which shows a balance or a calculating machine which comprises a movable carriage.

The functional instructions, such as "line spacing," "carriage return," "finding total," "finding sub-total," "printing results," "do not add," or the like, can be initiated, in known manner, by function keys which are provided either in the keyboard of the typewriter or in the keyboard of the calculating machine. It is also known to provide corresponding function keys on the keyboards of both machines, by means of which keys the individual functions can be initiated as desired. It is further known to control such functions automatically and in a specific sequence, for example depending on the movement of the typewriter carriage. In order to solve the problem, this carriage may, for example, be provided with a program bar or the like, which carries adjustable stops by which contacts, which are fixed to the frame of the typewriter, are closed when the carriage is in a desired position. These contacts can initiate operations, line spacing, calculating operations or like functions in the accounting machine consisting of a typewriter and a calculating or balance-finding machine in accordance with a program predetermined by the set stops.

Such a known contact device for accounting machines consisting of electrically connected typewriters and calculating machines, wherein the typewriter carriage advancing in accordance with the escapement steps closes successive circuits, is constructed in such a manner that the carriage-controlled contacts are constructed in the form of leaf-spring contacts and are arranged staggered, side-by-side, stepped one above the other, and parallel to the direction of travel of the carriage, and are closed through push-rods which are actuated by the carriage and which are bent at right angles to the direction of travel of the carriage, their heads being staggered side by side in at least two parallel rows.

The switching program which is controlled by such an "instruction mechanism" takes place depending on the movement of the carriage. It is true that it can be varied in time within certain limits by exchanging or selecting individual push-rods but the possible variations are nevertheless determined within comparatively narrow limits.

Program courses of this type are no longer adequate to meet the numerous different requirements of the modern art of accounting. In order to be able to utilize to the full all the possibilities which result from the combination of ordinary commercial typewriters and calculating machines, which is a particular advantage from the point of view of cost in comparison with large and expensive automatic accounting devices, it is necessary and desirable to provide additional possibilities for variation in the initiation of specific program courses.

In order to meet this requirement, it is the object of the present invention, to provide in accounting machines, and particularly in those automatic accounting devices which consist of typewriters and calculating machines which are electrically connected together, built-in "routine branches" between the main program and subroutines of automatic accounting-machine functions, which routine branches can be called upon selectively as a result of an automatic logical decision by one of the inter-combined machines.

In order to achieve this object, the invention is characterized in that those elements of an automatic accounting device which can make automatic logical decisions, can be coupled to single or multiple switches which are operationally connected, either directly or through preselector switches, to the drive of routine-branching switches which are provided in the circuits of the function switches in such a manner that, as a result of the logical decision, they either ensure the supply of current for the course of the normal function program or interrupt it for the duration of the course of a subroutine which can be derived therefrom and only apply voltage to individual function switches or groups of switches.

The elements of the accounting machine which can make logical decisions are normally calculating units, counters, balance-finding units or the like. They also, however, include manually operated or remote-controlled function keys.

The device according to the invention co-operates to advantage with an existing device for controlling the program course. As soon as one of the aforesaid automatic logical decisions has been reached in one of the machines, the normal program course is interrupted by the new device and its place is taken by the course of a special routine or sub-routine. Normally, the special routine or subroutine consists of a sequence of functional processes which also occur in the normal or main program. After the termination of the special routine, the normal circuit for the main program is re-established so that this can proceed in its consecutive steps.

The essence of the present invention can best be explained when the routine branching is initiated depending on the sign of one of the balance-finding units in the calculating machine. The sign of the balance-finding unit is detected from the position of the balance setting-disc as a Yes/No response and is transmitted to a switch, preferably a reversing switch. The contact positions of this reversing switch correspond either to the positive or negative sign of the contents of the balance-finding unit. Decisions regarding the program course have to be reached depending on the position of the balance setting-disc of the balance-finding unit at the end of a calculating operation. If the contents of the balance-finding unit are positive, for example, the normal program is carried out. If on the other hand, the contents of the balance-finding unit are negative after a calculating operation, then according to the present invention, the course of the normal program of the auomatic accounting device is interrupted and a special routine is carried out. The special routines which are followed, depending on the contents of the balance-finding unit, can be controlled as desired at any time so that they lead back into the basic program. In addition, means may be provided to make the decisions of the balance-finding unit effective again after the completion of a program.

It is expressly emphasized that the control in the device according to the invention does not have to start from the contents of a balance-finding unit but that any conceivable element of the automatic accounting device which can make logical decisions, is in a position to initiate a routine branching. Routine branches can, of course, also be initiated by special function keys.

In the device according to the invention, additional keyboard-controlled, a push-rod controlled or remote-controlled preselector switches may be provided through which the possible variations with regard to the sub-routines to be branched off are increased. The following plan shows the methodology of controlling the routine branching depending on the two preselector switches A and B, with respect to the balance-finding unit already mentioned. In each of the preselector positions set by A or B, the balance-finding unit may indicate $+$ or $-$, so that as a result of a derived logical decision, the automatic accounting device has the possibility of selectively branching off the routines $A_+$, $A_-$, $B_+$ $B_-$ from the main program. The preselector switches may be controlled by stops on the program bar of the typewriter.

| | |
|---|---|
| Slider A with register contents $+$. | Slider A with register contents $-$. |
| Slider B with register contents $-$. | Slider B with register contents $+$. |
| Typewriter type. | Typewriter do not type "NS". |
| Balance-finding machine do not print "NP". | Balance-finding machine print. |
| Simple carriage jump. | Skip "üSp". |
| Total, Register I in balance-finding machine "*I". | Sub-total, Register I, Balance-finding machine "$\overset{\Lambda}{\vee}$". |
| Set balance-finding machine Register I to addition "I+". | Set balance-finding machine Register I to subtraction "I−". |
| Type date in typewriter "Dat". | Do not type date in typewriter. |
| Typewriter carriage, carriage return "WR". | Typewriter, simple carriage jump. |

Considering the language in the above table, it will be appreciated that "A" and "B" refer to switches 3 and 4, respectively, shown in the accompanying drawings, while the reference to register contents indicates the particular branching system to be untilized. Thus, a sub-program can be undertaken through the use of switch 3 when the register indicates a positive or negative total and a similar choice is available with respect to switch 4.

The remaining seven recitations in each column refer to the functions which can be indicated during the sub-programs. The symbols associated with the functions indicate the symbols which can be employed on the keys, such as typewriter keys, which are untilized for manual operation.

Specifically, the expression "do not type NS" means that the machine will not type when the switch associated therewith is actuated. The NS is merely the symbol on the key associated with the particular switch. "Typewriter type" simply means that the typewriter will operate in a manner such that it can be operated by hand. "Balance-finding machine do not print" indicates that the balancing or accounting machine is locked while a separate function switch releases this machine for operation. "NP" refer to the symbol on the key.

With respect to "simple carriage jump" or "skip" this refers to the paper carriage of either the typewriter or the accounting machine being adapted to jump from a particular position into the initial typing position in the next accounting column. The explanation of other material is as follows:

"DAT"—The typewriter prints out the date.
"WR"—The typewriter carriage returns to its initial typing position.

It may happen that a plurality of pairs of functions have to be controlled selectively and that the stops A and B have to be set in two successive stop positions to be operated. In this case, the device accounting to the invention ensures that the first decision is retained until the second decision has been reached. An additional function $F$=retaining stop, which has to be actuated, serves this purpose Some advantageous possible applications of the routine branching according to the invention will be explained with reference to the example, on which the present description is based, in which the logical decisions are reached by a balance-finding unit.

Although a main program is being followed, an automatic balance sorting is possible on the basis of the sign of the contents of the balance-finding unit and of the routine branching initiated as a result. Moreover, an automatic accounting machine, which consists of an electrically connected combination of typewriter and balance-finding machine and in which the balance-finding machine comprises only two balance-finding units, can carry out a fully automatic business progress report for which three balance-finding units are usually required. A further application of the present invention is stock control and requisite accounting, shortages being recorded automatically including the automatic issue of an order form. In addition, the device to the invention permits a warning letter to be written out automatically, for example when an account is overdrawn.

Further details, features and advantages of the present invention are disclosed in the following description with reference to the accompanying drawings in which.

Figure 1:
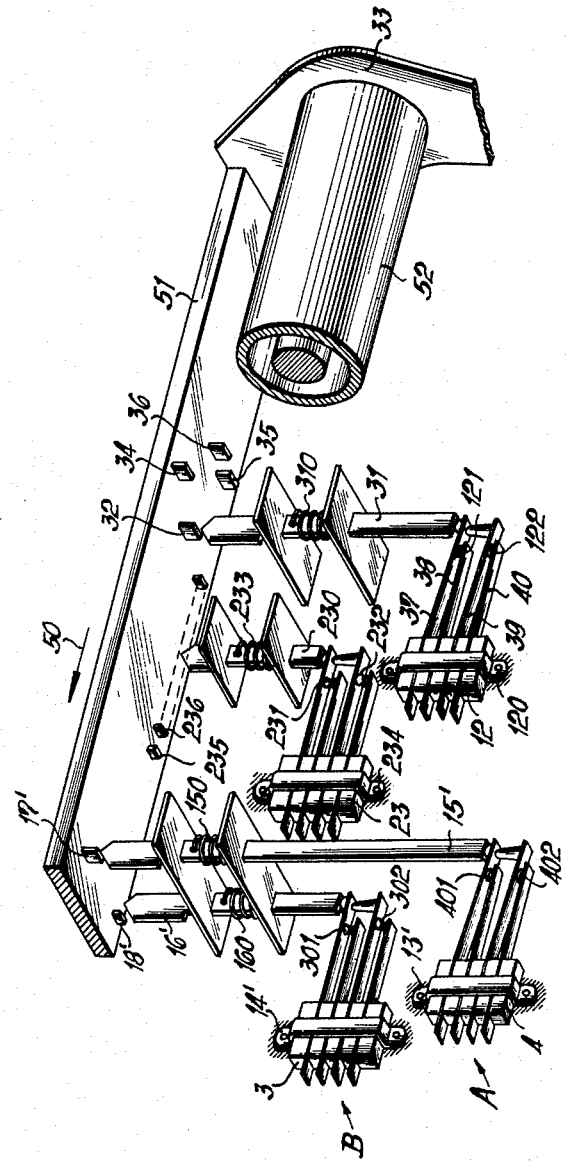
FIGURE 1 is a diagrammatic partial view of a carriage with a program bar, slider stops, push-rods and switches.

In FIGURE 1, a carriage 33 carries a platen 52 and a program bar 51. The program bar 51 carries sliders 17', 18' and 32 which can operate the associated switches 3, 4 and 12 through the push-rods 15', 16' and 31 co-operating with the springs 160, 150, 310. The slides 34, 35 and 36 etc. for further function switches which are not shown in FIGURE 1, may also be arranged staggered transversely over the contact bar 51. They serve to operate function switches 13–20 shown in FIGURES 2 and 3, in accordance with a desired program, according to whether they are set or not, as the carriage 33 advances step-by-step. The switches 12 to 20, as the switch 12 in FIGURE 1 shows by way of example, are provided with contact springs 37–40 in a suitable manner.

Figure 2:
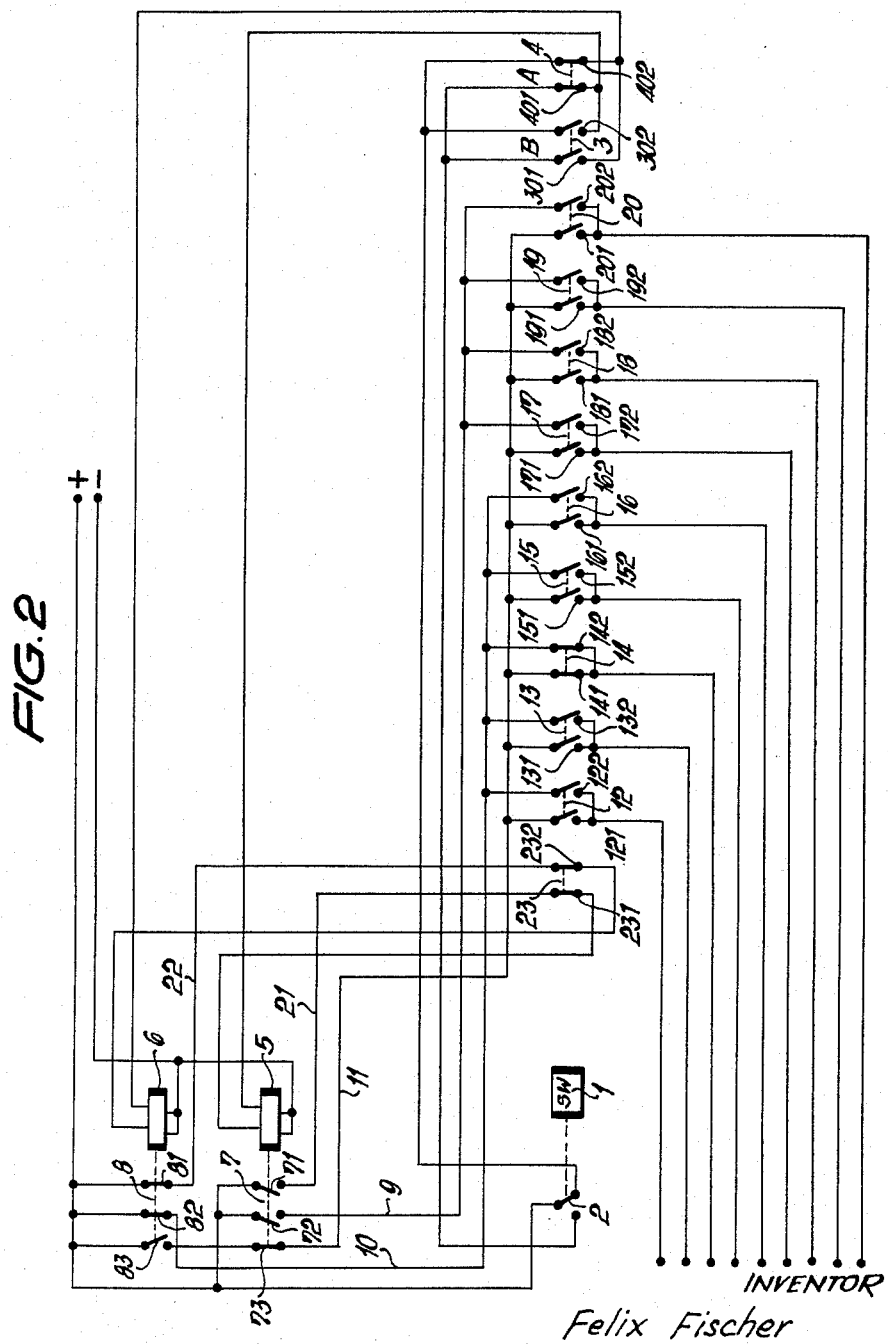
FIGURE 2 shows the circuits of the device in their condition for a Case A when the contents of the balance-finding unit are positive.

As shown in FIGURE 2, the preselector switches 3 and 4 preselect case A or B for the routine branching, according to which of the two has been actuated by one of the sliders 17' or 18'. The switches 3 and 4 are secured to the frame of the typewriter, for example by straps 13', 14', in such a manner that they are always actuated in time, before the function switches 12–20. It is assumed that the carriage is moving step-by-step in the direction of the arrow 50.

In the following description of an example of an embodiment, it is presupposed that the function switches 12–20 can initiate the following operations:

(1) Printing datum
(2) Register I, addition;
(3) Register I, finding total;
(4) Carriage return;
(5) Balance-finding machine not printing;
(6) Register I, subtraction;
(7) Register I, sub-total;
(8) Actuation of a magnet $M_2$ to initiate an operation;
(9) Typewriter not typing.

For Case A₊ with positive contents in the balance-finding unit, the functions 1 to 5 of these 9 functions are initiated, whereas in case A with negative contents in the register, only the functions 6 to 9 are to be branched off from the main program.

Figure 3:
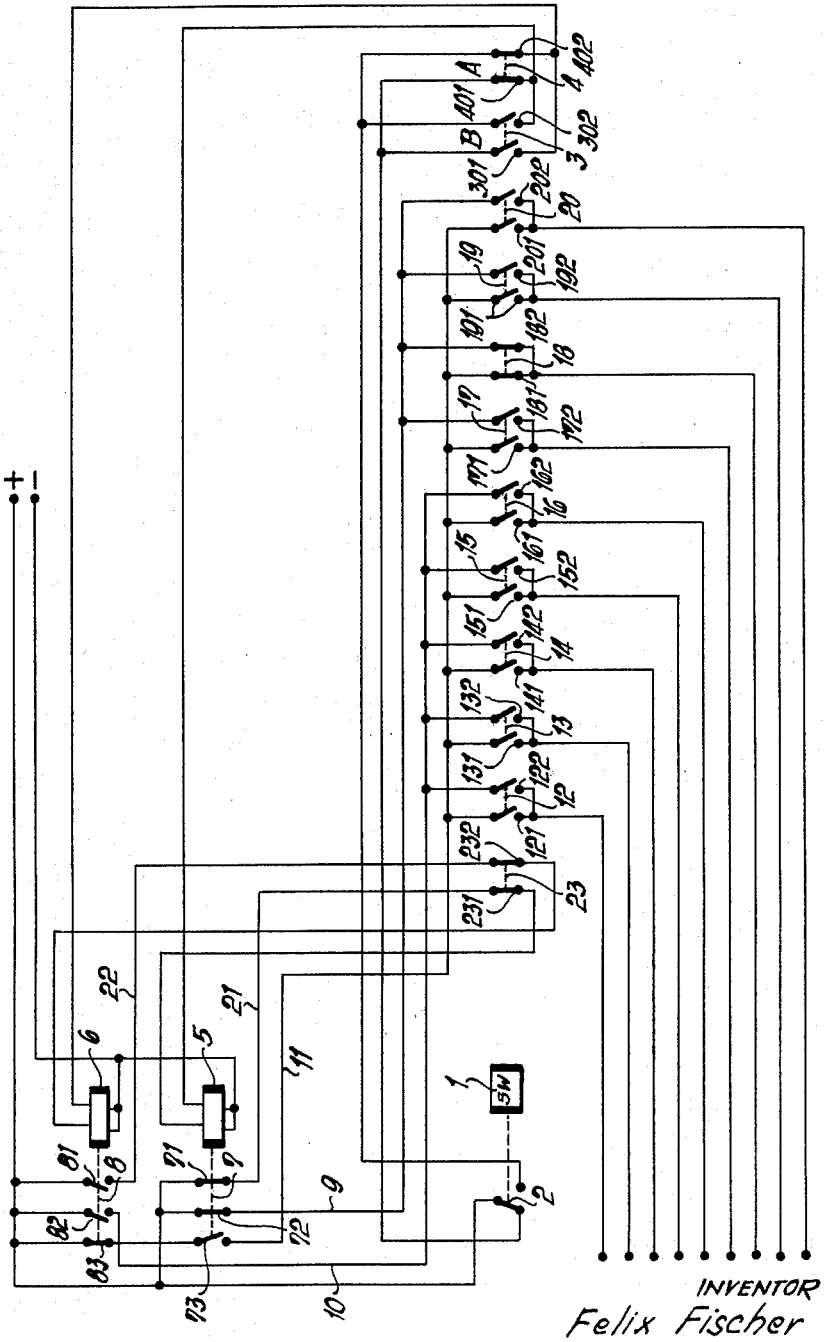
FIGURE 3 shows the circuits of the device in their condition for the Case A when the contents of the balance-finding unit are negative.

Referring to FIGURES 2 and 3, the function switches 12 to 20 are normally connected to the positive terminal of the current supply through the conductor 11 and break contacts 73 and 83 of switches 7 and 8. Contacts 121 to 201 of the function switches can then initiate the functions 1–9 mentioned above in the normal course of a program. Each function switch comprises a second pair of contacts 122–202, which comes into action in the event of routine branching. The sets of contacts 122 to 162 of the function switches 12 to 16 form a group and are connected to the positive terminal of the current supply through a conductor 10 and make contacts 82 of the switch 8 (see FIGURE 2). The contacts 172 to 202 of the switches 17 to 20 form a parallel group through a conductor 9 and are connected to the positive terminal of the current supply through make contact 72 of the switch 7 (see FIGURE 3).

1 designates any element in the calculating machine balance-finding machine or typewriter, which can make logical decisions. This element 1 (in the present case a balance-finding unit) is connected to a reversing switch 2 which can apply voltage through the contacts of the switches 3 and 4 to the energizing winding 5 or 6 of the selector switches 7 and 8 respectively, depending on the sign of the contents of the balance-finding unit.

It is assumed that for the case A₊ the reversing switch 2 is in the position shown in FIGURE 2 and that the switch 4 has previously been closed by the slider 17' through the push-rod 15'. In this case, the energizing winding 6 of the switch 8 receives voltage through the contact 402 of the switch 4. FIGURE 2 shows the energizing winding 6 of the switch 8 in the attracted condition. The break contacts 83 interrupt the supply of current to the contacts 121 to 201 of the function switches 12 to 20 and the make contact 82 applies voltage to the contacts 122 to 162 of the switches 12 to 16. The energizing winding 6 of the switch 8 is connected to the current terminals in a self-holding circuit through self-holding contacts 81 of the switch 8, the conductor 22 and contacts 232 of a switch 23. The switch 23 is normally closed and is opened after the termination of the routine branching so that the self-holding circuit of the energizing coil 6 of the switch 8 is interrupted after which the original circuit of the function switches is restored for the course of the normal program through closing of the break contacts 83 and opening of the make contacts 82.

In FIGURE 2, the energizing coil 5 of the switch 7 is in the de-energized state and the switch 7 is in the normal position.

FIGURE 3 shows the condition of the circuit arrangement for the case A₋. The reversing switch 2, which is coupled to the balance-finding unit is moved to the left in accordance with the logical decision of the balance-finding unit I. In this switch position, voltage is applied to the energizing coil 5 of the switch 7 through the contact 401 of the switch 4. The energizing coil 5 has attracted. The break contacts 73 of the switch 7 have opened and so interrupted the supply of current to the contacts 121–201 of the function switches 12–20. Voltage is applied to the contacts 172 to 202 of the switches 17 to 20 through the make contacts 72 and the conductor 9. A self-holding contact 71 is closed so that the energizing winding 5 of the switch 7 is self-holding through the contacts 71 and contacts 231 of the switch 23.

The preselector switches 3 and 4 are similar to each other and similarly connected, except that they are oppositely polarized, as will be evident from FIGURES 2 and 3. Thus, with the reversing switch 2 in the position shown in FIGURE 2, closure of the preselector switch 3 will energize the relay switch 7, while closure of the preselector switch 4 will energize the relay switch 8.

It will be apparent that the provision of two preselector switches 3 and 4 makes it possible to preselect either of the routine-branching switches 7 and 8 for a given position of the reversing switch 2. Thus, the preselector switch "B" operates in the same manner as the selector switch "A" but through engagement with a different means shown at 18' in the drawings. This switch controls the same functions as are controlled by the switch "A" although under different conditions. The Examiner has stated that these switches appear to control identical functions, however, as noted on page 3, lines 3 through 9, Amendment "B," the switches are not identical but are oppositely polarized. Referring to FIGURE 2, it will be noted that when the switch 2 is in the condition shown, closing of the switch "A" energizes relay 6 to bring function switches 12 through 16 into play. If the switch "B" were closed in FIGURE 2, the relay 5 would be energized and the function switches 17 through 20 would be included in the circuit. This arrangement makes it possible to preselect either of the routine branching switches 7 and 8 at a given position of the reversing switch 2. As noted on page 7 of the specification, the particular combination selected depends upon whether the register contents are plus or minus.

The relationship of the switches "A" and "B" can be best understood by considering the situation wherein the actuator 17' is moved into actuating position. As the carriage moves under this condition, the relay 6 is energized if the switch 2 indicates a positive condition, and the relay 5 is energized if a negative condition is indicated. If, however, the actuating means 18' were pushed down, and, therefore, located for closing switches and the actuating means 17' were in the up position, then the same carriage movement would provide a different result. Thus, the relay 5 would be energized under positive conditions and the relay 6 under negative conditions.

*Mode of operation*

Case $A_+$.—It is assumed that the slider 17', FIGURE 1, at the beginning of the contact bar 51 is pressed and holds the contacts 401, 402 of the switch 4 closed through the push-rod 15 against the force of the spring 150. The reversing switch 2 is in the right-hand switch position illustrated in FIGURE 2. Of the main program consisting of 9 functional procedures, only the first 5 functional procedures can take place as a branched-off routine, in this circuit arrangement.

The contacts 121 to 201 of the switches 12–20 are opened through the break contact 83 of the switch 8 and the make contact 82 of the switch 8 applies voltage to the contacts 122 to 162 in the first group of function switches 12 to 16. The energizing winding 6 of the switch 8 is self-holding through the closed contact 232 of the switch 23 even when the slider 17' comes out of operational connection with the push-rod 15' during the following step-by-step advance of the carriage 33, after which the switch 4 opens again.

It is assumed that, the function switch 14 is closed at a desired moment by means of a slider, for example one of the sliders 34, 35, 36 and its associated push-rod, not shown in FIGURE 1, through the carriage 33 advancing step-by-step.

The switch 14 applies voltage to a magnet known per se and not illustrated, for example in the balance-finding machine, which magnet initiates the drawing up of a total for the register I. Then, in the predetermined carriage position, the total is taken in known manner from the register I, printed, transferred to the electric store and, beginning from the highest decimal, typed out in decimal mode on the typewriter. When this function, initiated on the basis of the logical decision of the balance-finding unit I, has been carried out, the routine branching can be cancelled by actuation of the switch 23 unless other routines are to be called up. The switch 23 is then actuated by a push-rod, opens and interrupts the self-holding circuit of the energizing winding 6 of the switch 8. The energizing winding 6 is de-energized so that the switch 8 is restored to its normal position. The routine branching is interrupted and the original switch condition of the device is restored.

The course of the routine branching for Case A_ takes place in a corresponding manner to that described with reference to the example of initiating the drawing up of a total for the register I. In this case, voltage is applied to the winding 5 of the switch 7 through the contacts 401 of the switch 4 and a circuit is prepared to the switches 17 to 20 (see FIGURE 3), of which, for example switch 18 may be closed by a slider so that the function, sub-total register I, can be initiated.

It is clear that the function switches can be selectively divided into groups as desired. It is also possible to provide more preselector switches instead of two preselector switches 3 and 4, so that a still greater possibility of variation can be provided with regard to branch routines. It is also possible to connect the reversing switch 2 to any desired element in the combination of accounting machines which can automatically make logical decisions.

With the device according to the invention, it is possible to interrupt any program taking place in consecutive steps and to carry out the branch routine. The moment of restoring the course of the branched-off routine to the original program can also be determined selectively.

The return moment is determined by the selection of a slider 235, 236 etc. for operating the switch 23. The switch 23 is actuated by the set slider through a push-rod 230 against the force of a spring 233 and is secured to the housing of the machine by means of a strap 234.

We claim:

1. In an accounting machine, the combination comprising a plurality of function switches for controlling a plurality of functions of the machine, programming means for actuating at least some of said function switches in a predetermined sequence to provide a program of functions for the machine, a plurality of routine-branching switches, each of said routine-branching switches having a break contact and a make contact, a main energizing circuit connected to said function switches and including said break contacts in series so that said main circuit will energize said function switches when none of said routine-branching switches is actuated, each of said routine-branching switches having an associated alternate energizing circuit connected to some of said function switches and including the make contact of the corresponding routine-branching switch so that said alternate circuit will be effective when said routine-branching switch is actuated, decision making means for arriving at a plurality of logical decisions based on the operation of the machine, a program modifying switch operable to a plurality of positions in accordance with said decisions, and circuit means connecting said program modifying switch to said routine-branching switches for actuating each of said routine-branching switches in one of said positions of said program modifying switch to provide modified programs for the machine based on said logical decisions.

2. The combination of claim 1, in which each of said routine-branching switches includes a holding contact and an associated holding circuit for maintaining the actuation of the routine-branching switch, and additional switch means operable by said programming means for disabling said holding circuits.

3. In the combination of an accounting machine and a program modifying device and including a carriage, means electrically interconnecting the same whereby functions of said accounting machine can be initiated through operation of said program modifying device, the improvement comprising a plurality of selectively operable switch actuating means connected for movement with said carriage, a plurality of function switches mounted in said program modifying device in the path of movement of said switch actuating means, said switches being provided for controlling a plurality of functions of the accounting machine, programming means including said switch actuating means for actuating said function switches in a predetermined sequence to provide a program of functions for the machine, first and second routine-branching switches, break contacts associated with said branching switches and an energizing circuit including said break contacts for selectively energizing and de-energizing first and second groups of said function switches, decision making means for reaching at least first and second logical decisions based on the operation of the machine, program modifying switch means operable to a plurality of positions in accordance with said decisions, and circuit means connecting said program modifying switch means to said routine-branching switches for actuating each of said routine-branching switches in one of said positions of said program modifying switch means to provide modified prorgams for the machine based on said logical decisions.

4. A combination in accordance with claim 3 wherein said routine-branching switches are selectively operated by means of additional switch actuating means carried by said carriage and by means of additional switches disposed in the path of movement of said additional switch actuating means.

References Cited by the Examiner

UNITED STATES PATENTS

| 1,932,220 | 10/33 | Kottman | 235—60.12 |
| 2,229,834 | 1/41 | Anderson | 235—60 |
| 2,813,611 | 11/57 | Frieberg | 235—60.47 |
| 2,864,554 | 12/58 | Rolph | 235—60.12 |
| 2,917,233 | 12/59 | Grady | 235—60.47 |
| 3,007,632 | 11/61 | Dilling | 235—60.47 |
| 3,083,900 | 4/63 | Runde | 235—60.49 |

FOREIGN PATENTS 1,064,263 8/59 Germany.

LEO SMILOW, *Primary Examiner.*